United States Patent
Verschuren

(10) Patent No.: US 7,385,883 B2
(45) Date of Patent: Jun. 10, 2008

(54) STRAY FIELD EQUALIZATION FOR IMPROVED DOMAIN EXPANSION READING

(75) Inventor: Coen Adrianus Verschuren, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 477 days.

(21) Appl. No.: 10/517,105

(22) PCT Filed: May 21, 2003

(86) PCT No.: PCT/IB03/02197

§ 371 (c)(1),
(2), (4) Date: Dec. 7, 2004

(87) PCT Pub. No.: WO03/105127

PCT Pub. Date: Dec. 18, 2003

(65) Prior Publication Data

US 2005/0219961 A1    Oct. 6, 2005

(30) Foreign Application Priority Data

Jun. 10, 2002  (EP)  ................................. 02077258

(51) Int. Cl.
*G11B 11/00*  (2006.01)

(52) U.S. Cl. .................................. 369/13.09

(58) Field of Classification Search ...................... None
See application file for complete search history.

(56) References Cited

U.S. PATENT DOCUMENTS 5,974,022 A    10/1999  Kimura et al.
5,991,252 A    11/1999  Kimura et al.
6,295,253 B1   9/2001   Mitani et al.
6,314,061 B1   11/2001  Miyaoka
6,385,141 B1*  5/2002   Tani et al. ................ 369/13.54
6,567,348 B1   5/2003   Wakabayashi et al.
7,027,365 B2*  4/2006   Verschuren et al. ...... 369/13.09

FOREIGN PATENT DOCUMENTS

| JP | 2000149344 | 5/2000 |
| JP | 2000149346 | 5/2000 |
| JP | 2000222731 | 8/2000 |
| JP | A260079 | 9/2000 |
| JP | 2001256691 | 9/2001 |
| WO | WO02103692 A1 | 12/2002 |

* cited by examiner

Primary Examiner—Tan Dinh

(57) ABSTRACT

In a magneto-optical recording technique by which an improved domain expansion reading is achieved, a mark region is recorded as a sub-mark portion and an adjacent sub-space portion, wherein the sum of predetermined first and second lengths of the sub-mark and sub-space portions, respectively, is changed in dependence on the pattern of marks and spaces. The write strategy enables writing a long run length with sub-mark and/or sub-space lengths selected independent of the channel bit length, such that a long run length can be written with few well-chosen domains with a stray field larger than the minimum field for MAMMOS readout. In this way, differences in readout conditions for all combinations of short and long run lengths can be eliminated, resulting in substantially improved power margins for random data.

20 Claims, 9 Drawing Sheets

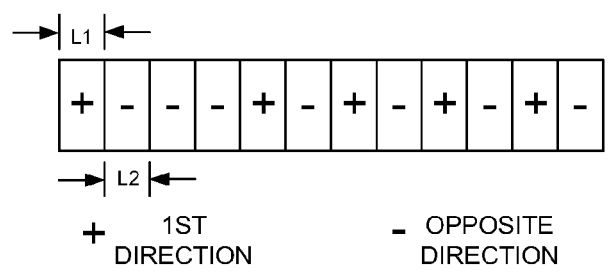
FIG. 7
PRIOR ART
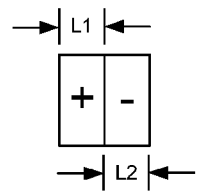 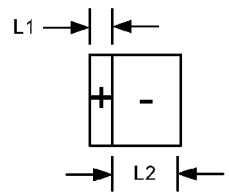
FIG. 8A    FIG. 8B

STRAY FIELD EQUALIZATION FOR IMPROVED DOMAIN EXPANSION READING

BACKGROUND OF THE INVENTION

1. Field of the Invention

The present invention relates to a method, apparatus and recording medium for recording an information as a pattern of marks and spaces on a recording track. In particular, the present invention relates to a recording technique for a domain expansion system, such as a Magnetic AMplifying Magneto-Optical System (MAMMOS).

2. Description of the Related Art

In magneto-optical storage systems, the minimum width of the recorded marks is determined by the diffraction limit, i.e., by the Numerical Aperture (NA) of the focussing lens and the laser wavelength. A reduction of the width is generally based on shorter wavelength lasers and higher NA focussing optics. During magneto-optical recording, the minimum bit length can be reduced to below the optical diffraction limit by using Laser Pulsed Magnetic Field Modulation (LP-MFM). In LP-MFM, the bit transitions are determined by the switching of the field and the temperature gradient induced by the switching of the laser. For read-out of the small crescent shaped marks recorded in this way, Magnetic Super Resolution (MSR) or Domain Expansion (DomEx) methods have to be used. These technologies are based on recording media with several magneto-static or exchange-coupled RE-TM layers. According to MSR, a read-out layer on a magneto-optical disk is arranged to copy a mark from the storage layer only in a small region of the readout spot and mask adjacent bits during reading, while, according to domain expansion, a domain in the center of a spot is expanded. The advantage of the domain expansion technique over MSR results in that bits with a length below the diffraction limit can be detected with a similar signal-to-noise ratio (SNR) as bits with a size comparable to the diffraction limited spot. MAMMOS is a domain expansion method based on magneto-statically coupled storage and read-out layers, wherein a magnetic field modulation may be used for expansion and collapse of expanded domains in the read-out layer.

However, when long run lengths are written in a MAMMOS medium, the magnetic stray-field in the center of the domain corresponding to the long run length is weaker than at the borders thereof (in the tangential direction). At a particular "critical length", the magnetic stray-field in the center of the run length becomes insufficiently strong to generate a MAMMOS signal in that area, i.e., to obtain a copied domain in the read-out layer. This results in an erroneous bit stream. The problem can be solved by increasing the reading power of the laser, thus increasing the total temperature and thereby the local magnetic stray-field of the storage layer and, at the same time, decreasing the coercivity of the readout layer. If the increase in the magnetic stray-field and the decrease in coercivity are sufficient, the previously missing MAMMOS signal will be generated. However, this procedure increases the thermal copy window which determines the resolution for read-out, such that extra false MAMMOS signals may be generated due to overlapping effects.

Japanese Patent Application No. JP-A-2000-260079 suggests a MAMMOS recording system in which a binary information of one bit is allotted to a magnetic section pattern constituted by a combination of two magnetic sections having magnetizations with opposite directions, such that a recording information that continues for two or more bits is formed in the recording layer as a series of magnetic section patterns with opposite magnetization. Thereby, a homogeneous stray-field is obtained, irrespective of the position of a respective read-out domain, even if it is located in the center of a continuous recording information. Hence, each unit of recording information can be reliably transferred to the playback layer. In particular, a mark region is recorded as a sequence of a sub-mark region having a length L1 and a following short sub-space region having a length L2. The ratios L2/L1 between the length of the sub-space region and the length of the sub-mark region is suggested to be in the range of 0.1 to 0.9. FIG. 7 herein shows an outline of such an arrangement representing the recording data of 101111, where the "+" sign represents the direction of the magnetic field for the sub-mark regions and the "−" sign represents the direction of the magnetic field for the sub-space regions.

For MAMMOS readout, the sum of the external field and the stray field from the bit pattern in the storage layer should be larger than the coercive field of the readout layer:

$$H_{ext} + H_{stray,storage} > H_{c,readout} \quad (1)$$

Because the stray field increases and the coercive field decreases with increasing temperature (proportional to laser power), a minimum temperature $T_{min}$ (or laser power) is required to fulfill this condition. On the other hand, if the laser power becomes too large, the dimensions of the area where the temperature is higher than this $T_{min}$ are so large that overlap with neighboring bits will occur. This will lead to false, additional peaks, such that a wrong number of peaks will be detected during readout of long mark run lengths, Moreover, small spaces cannot be detected at all. Therefore, the laser power should be controlled in such a way that the temperature in the center of the spot is just above $T_{min}$. The stray field also depends on the length of the written domain (and its surroundings).

FIG. 2A shows a stray field (in the normal direction z with respect to the recording surface) of a written domain or mark region along the track direction for different domain lengths or bit lengths ranging from 30 to 1000 nm. Furthermore, FIG. 2B shows a diagram indicating the maximum stray field $H_{z,max}$ and the stray field $H_{z,center}$ at the center of the domain as a function of the bit length. As can be seen from FIGS. 2A and 2B, the stray field decreases for bit lengths larger than 100 nm, especially near the center of the domain. This means that when the readout conditions are optimized, e.g., for a channel bit length b=100 nm, larger domains will not show any MAMMOS signals. When using a higher read power or larger external field, only the MAMMOS peaks from the center of the large domain will be missing. However, small domains can no longer be resolved.

FIG. 3 shows a diagram indicating the stray field versus the track direction for a channel bit length b=100 nm for a sequence of domains of a length corresponding to one channel bit length, i.e., I1 carriers (dashed line), and a continuous domain of a length corresponding to five channel bit lengths, i.e., an I5 carrier (solid line). In the upper part of FIG. 3, magnetization patterns corresponding to the stray field waveforms are indicated, wherein four subsequent plus signs indicated a mark region of a length corresponding to one channel bit length and wherein four minus signs indicated a space region of a length corresponding to one channel bit length. Curves 1 and 2 represent coercive field profiles at different values of $H_{c,readout} - H_{ext}$. In FIG. 3, the first situation corresponds to $H_{c,readout} - H_{ext}$ just below 27 kA/m (curve 1). In this case, only the tip of the thermal profile is used. When $H_{c,readout}-H_{ext}$ is around 12 kA/m in the hottest part of the spot (curve 2), the second situation applies. Here, I1 spaces (i.e., spaces with a length corresponding to one channel bit length) cannot be observed because the coercive field profile always overlaps with the stray field of neighboring marks. Stated more generally, for MAMMOS readout with the best resolution/power margin the difference between the largest value of the stray field and the lowest value among all combinations of run lengths should be as small as possible.

SUMMARY OF THE INVENTION

It is therefore an object of the present invention to provide a method, apparatus and medium for recording on a magneto-optical medium, by means of which the MAMMOS reading resolution and power margin can be improved.

This object is achieved according to the invention by providing a recording method comprising the acts of a) writing a mark region by having at least one sub-mark portion of a predetermined first length magnetized in a first direction substantially perpendicular to a recording surface of said recording medium and by having at least one adjacent sub-space portion of a predetermined second length magnetized in a second direction opposite to said first direction; and b) selecting the sum of said predetermined first and second lengths in dependence on said pattern of marks and spaces. The object is also achieved by providing a recording apparatus comprising a) writing means for writing a mark by having at least one sub-mark portion of a first predetermined length of said magneto-optical recording medium magnetized in a first direction substantially perpendicular to the recording surface of said recording medium and by having at least one adjacent sub-space portion of a second predetermined length magnetized in a second direction opposite to said first direction; and b) control means for selecting the sum of said predetermined first and second lengths in dependence on said pattern of marks and spaces. Furthermore, the object is achieved by providing a recording medium on which an information is recoverably recorded on a recording track as a pattern of marks and spaces, wherein a mark region comprises at least one sub-mark portion of a first predetermined length magnetized in a first direction substantially perpendicular to the recording surface of said recording medium and at least one adjacent sub-space portion of a second predetermined length magnetized in a second direction opposite to said first direction, and wherein the sum of said predetermined first and second lengths is selected along said recording track in dependence on said pattern of marks and spaces.

Accordingly, equalization of stray fields from (combinations of) long and short run lengths can be achieved by suitably setting the lengths of the sub-mark and/or sub-space portions independent of the actual channel bit length. A long run length can be written with a few separate 'up'-domains with length and separation adjusted to the coercivity profile in order to give overlap at the required times. There is no need to use a periodic bit pattern inside a run length, as suggested in the known writing strategies. The right combinations can eliminate differences in readout conditions for all combinations of short and long run lengths, resulting in much improved margins for random data.

Increased flexibility is gained by using larger L2/L1 ratios (small sub-marks for smallest mark run lengths). The surrounding or neighboring run lengths influence the stray field of a domain structure due to the generated magnetic dipole fields with long range. Therefore, the write strategy for a run length should, in principle, be adapted based on the previous and the following data. The only requirement for MAMMOS readout is that there should be an overlap between the coercive field and the stray field from the bit pattern where MAMMOS expansion should occur.

As a further advantage of the proposed solution, the effective length of a run length can be reduced at its end(s). In this way, the resolution and/or power margin can be further improved, because an unwanted overlap of the stray field with the coercivity profile is suppressed.

It is to be noted that all other laser power and field control methods based on (indirect) measurements of the overlap (or the copy window) can still be used. The sub-mark portions and sub-space portions of long run lengths can be written in such a way that the overlap around, e.g., the center of the run length is sensitive to a certain range of laser powers or external fields. The locally reduced power margin at the center might otherwise lead to a missing peak if the laser power is slightly too low, or vice versa. When well chosen, the proposed write strategy can be used to complement or refine other control methods. Specifically, the sum of said predetermined first and second lengths may be set to be greater than a channel bit length. Then, the number of the sub-mark portions in the concerned mark region can be made smaller than the number of channel bits which correspond to the run length of the mark region. As an example, a mark region with a run length corresponding to five channel bits may be written with three sub-mark portions separated by corresponding sub-space portions.

As a further improvement, the distance between the storage layer and the readout layer may be set based on a difference between the largest and the lowest values of a stray field along said mark region, to thereby set the stray field level at the readout layer.

BRIEF DESCRIPTION OF THE DRAWINGS

In the following, a preferred embodiment of the present invention will be described in greater detail with reference to the accompanying drawing figures, in which:

FIG. 7 diagrammatically shows an example of the sub-mark regions and the sub-space regions in a recording track; and FIGS. 8A and 8B show examples of a sub-mark region and its corresponding sub-space region with varying lengths.

DESCRIPTION OF THE PREFERRED EMBODIMENTS

Figure 1:
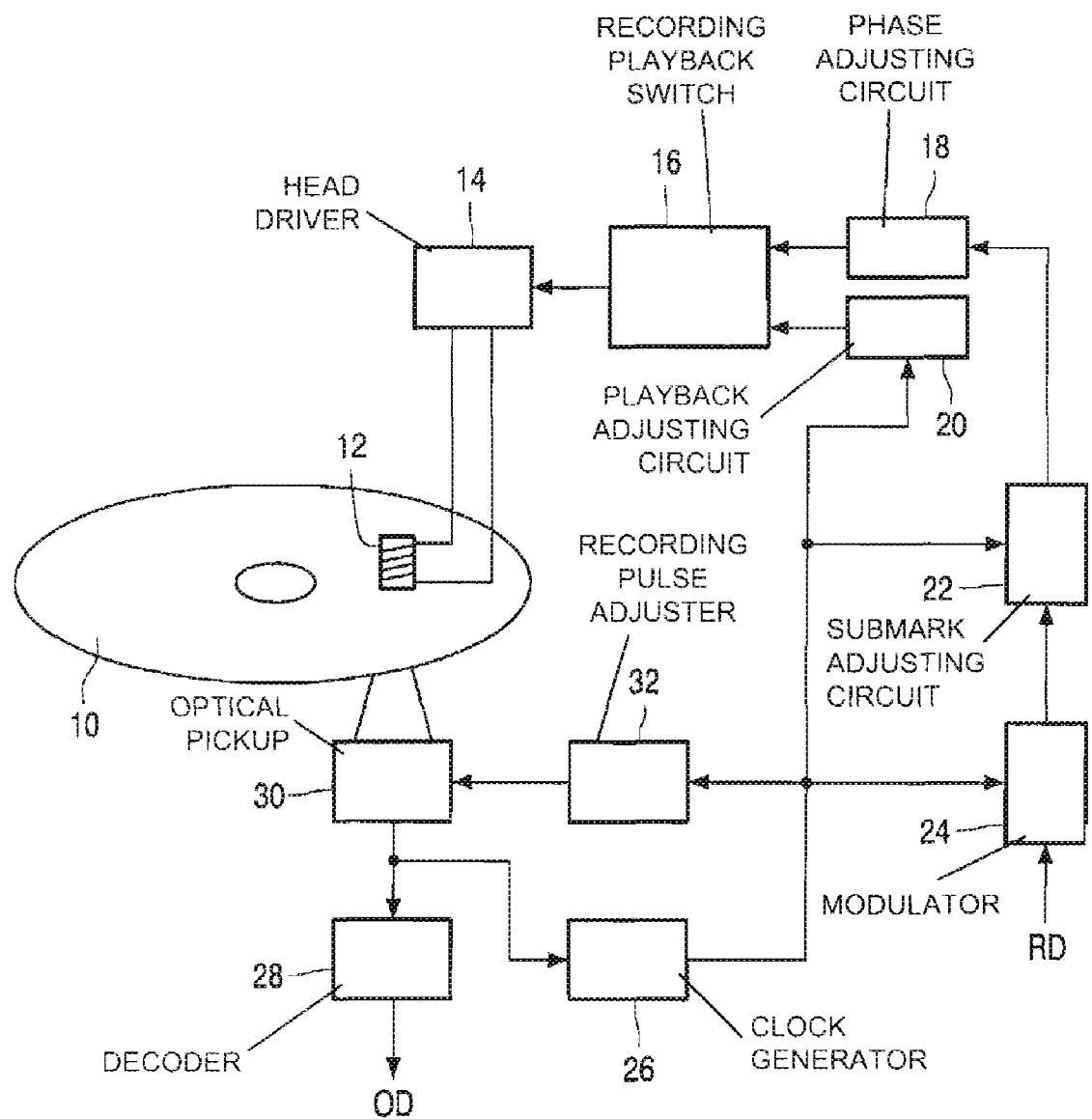
FIG. 1 shows a schematic block diagram of a MAMMOS disk player according to the preferred embodiment.

The preferred embodiment will now be described on the basis of a MAMMOS disk player as indicated in FIG. 1. FIG. 1 schematically shows the construction of the disk player. The disk player comprises an optical pick-up unit 30 having a laser light radiating section for irradiation of a magneto-optical recording medium 10, such as a magneto-optical disk, with light that has been converted, during recording, to pulses with a period synchronized with code data, and a magnetic field applying section comprising a magnetic head 12 which applies a magnetic field in a controlled manner at the time of recording and, if required, also during playback on the magneto-optical recording medium 10. In the optical pick-up unit 30, a laser is connected to a laser driving circuit which receives recording pulses from a recording pulse adjusting unit 32 to thereby control the pulse amplitude and timing of the laser of the optical pick-up unit 30. The recording pulse adjusting circuit 32 receives a clock signal from a clock generator 26 which may comprise a PLL (Phase-Locked Loop) circuit.

It is noted that playback may not require a magnetic field if zero field MAMMOS is used. Furthermore, it is noted that, for reasons of simplicity, the magnetic head 12 and the optical pickup unit 30 are shown on opposite sides of the disk 10 in FIG. 1. However, according to the preferred embodiment, they should be arranged on the same side of the disk 10.

The magnetic head 12 is connected to a head driver unit 14 and receives, at the time of recording, code-converted data via a timing adjusting circuit, such as a phase adjusting circuit 18, and a sub-mark adjusting circuit 22 from a modulator 24. The modulator 24 converts input recording data to a prescribed code, and the sub-mark adjusting circuit 22 converts each mark region of the prescribed code into a sub-mark portion or region and a sub-space region, while a first predetermined length L1 of the sub-mark portion and a second predetermined length L2 of the sub-space portion are set based on the pattern of marks and spaces to be written to the disk 10. In particular, the sub-mark adjusting circuit 22 may be adapted to set the first and second predetermined lengths L1 and L2 in such a manner as to achieve or maintain a predetermined stray field characteristic required for an adequate detection of the mark and space pattern to be written. It is noted that the sub-mark adjusting circuit 22 may as well be arranged within the modulator 24.

At the time of playback, the head driver 14 receives a clock signal via a playback adjusting circuit 20 from the clock generator 26, wherein the playback adjusting circuit 20 generates a synchronization signal for adjusting the timing and pulse amplitude applied to the magnetic head 12. A recording/playback switch 16 is provided for switching or selecting the respective signal to be supplied to the head driver 14 at the time of recording and at the time of playback. However, this switching feature is not required for zero field MAMMOS, since then no magnetic field has to be applied during playback.

Furthermore, the optical pick-up unit 30 comprises a detector for detecting laser light reflected from the magneto-optical recording medium 10 and for generating a corresponding reading signal applied to a decoder 28 which is arranged to decode the reading signal to generate output data. Furthermore, the reading signal generated by the optical pick-up unit 30 is supplied to a clock generator 26 in which a clock signal obtained from embossed clock marks of the magneto-optical recording medium 10 is extracted, and which supplies the clock signal for synchronization purposes to the recording pulse adjusting circuit 32, the playback adjusting circuit 20, the sub-mark adjusting circuit 22 and the modulator 24. In particular, a data channel clock may be generated in the PLL circuit of the clock generator 26.

For recording, MFM may be used, but LP-MFM is preferable. Then, the laser is pulsed once for each sub-mark and (at least) once for each sub-space. A practical solution could be an integer value of the sub-space/sub-mark length ratio and pulsing the laser at a frequency corresponding to the length of the sub-mark instead of the channel bit length. In any case, the laser's duty cycle (pulse shorter than the sub-mark length) and timing (phase between magnetic field and laser pulse) should be optimized.

In case of LP-MFM data recording, the laser of the optical pick-up unit 30 is modulated with a fixed frequency corresponding to half of the period of the data channel clock, and the data recording area or spot of the rotating magneto-optical recording medium 10 is locally heated with equal distances. Additionally, the data channel clock output by the clock generator 26 controls the modulator 24 and the sub-mark adjusting circuit 22 to generate a data signal with a standard clock period. The recording data are modulated and code-converted by the modulator 24 to obtain a binary run length information corresponding to the information of the recording data. In the sub-mark adjusting circuit 20, a mark region of the recording information is converted to at least one sub-mark portion and at least one sub-space portion, while a space region corresponding to a channel bit is maintained. Thus, a code run length consisting of a plurality of mark regions directly following each other is converted to a number of subsequent sub-mark and sub-space regions having respective predetermined lengths L1 and L2, respectively, selected to obtain a desired stray field characteristic a the readout layer of the disk 10 (see, for example, FIG. 7). The pattern of sub-mark and sub-space portions of the code data output from the sub-mark adjusting circuit 22 is forwarded to the phase adjusting circuit 18, and after phase adjustment, forwarded to the driver 14 via the recording/playback switch 16.

The structure of the magneto-optical recording medium 10 may correspond to the structure described in the JP-A-2000-260079.

According to the preferred embodiment, the sub-mark adjusting circuit 22 is arranged to increase the stray field for larger domain lengths by inserting regions with opposite magnetization direction. By individually and continuously choosing suitable values for the lengths L1 and L2 of the sub-mark portions and the sub-space portions, respectively, the stray field characteristic of short domains and large domains can be optimized to ensure proper reading and improved power margin.

Furthermore, the stray field level at the readout layer can be further improved by increasing the distance between the storage and the readout layer, however, at the expense of a reduction in stray field amplitude. Some reduction in stray field shouldn't be a problem for stable readout, so that this approach can be used to optimize disc structures.

Additionally, it should be considered that the surroundings, i.e., neighboring run-lengths, also influence the stray field of a domain structure, due to the long range of the magnetic dipole fields of the domains. Therefore, the write strategy for a run length could also be adapted at the sub-mark adjusting circuit 22 based on the previous and the following data. The length over which this influence is important depends on the disc structure, but is around a few 100 nm. For thermal profiles (much) narrower than this, the influenced region will be smaller because the magnetization becomes rapidly smaller away from the center of the thermal spot.

The proposed write strategy leads to an increased flexibility and allows, in principle, to eliminate differences in readout conditions for all combinations of short and long run lengths. The first thing to consider is that it is not necessary that the stray field is constant over the run length. The stray field needs to be high only where MAMMOS expansion should occur. More generally, the only requirement for MAMMOS readout is that there should be overlap between the coercive field and the stray field from the bit pattern where MAMMOS expansion should occur, e.g., by application of a sufficiently large external magnetic field. In the known simple write strategy, this can be achieved by using a periodic bit pattern of up/down magnetized regions where the up-regions are synchronized with the expansion direction of the external magnetic field.

However, there is no need to use a periodic bit pattern inside a run length as long as the pattern gives sufficient overlap with the coercivity profile. Therefore, it is possible to make use of the fact that the copy window (and with it the overlap) increases when the local stray field is higher than the minimum stray field to give MAMMOS readout (for a given laser power and external field). In this way, a long run length, for example, an I5 carrier, can be written with, e.g., 3 separate 'up'-domains with length and separation adjusted to the coercivity profile in order to give overlap at the required times. Hence, the sum of the length L1 of a sub-mark portion and the length L2 of a sub-space portion may continuously change and no longer needs to correspond to the channel bit length b.

Figure 4:
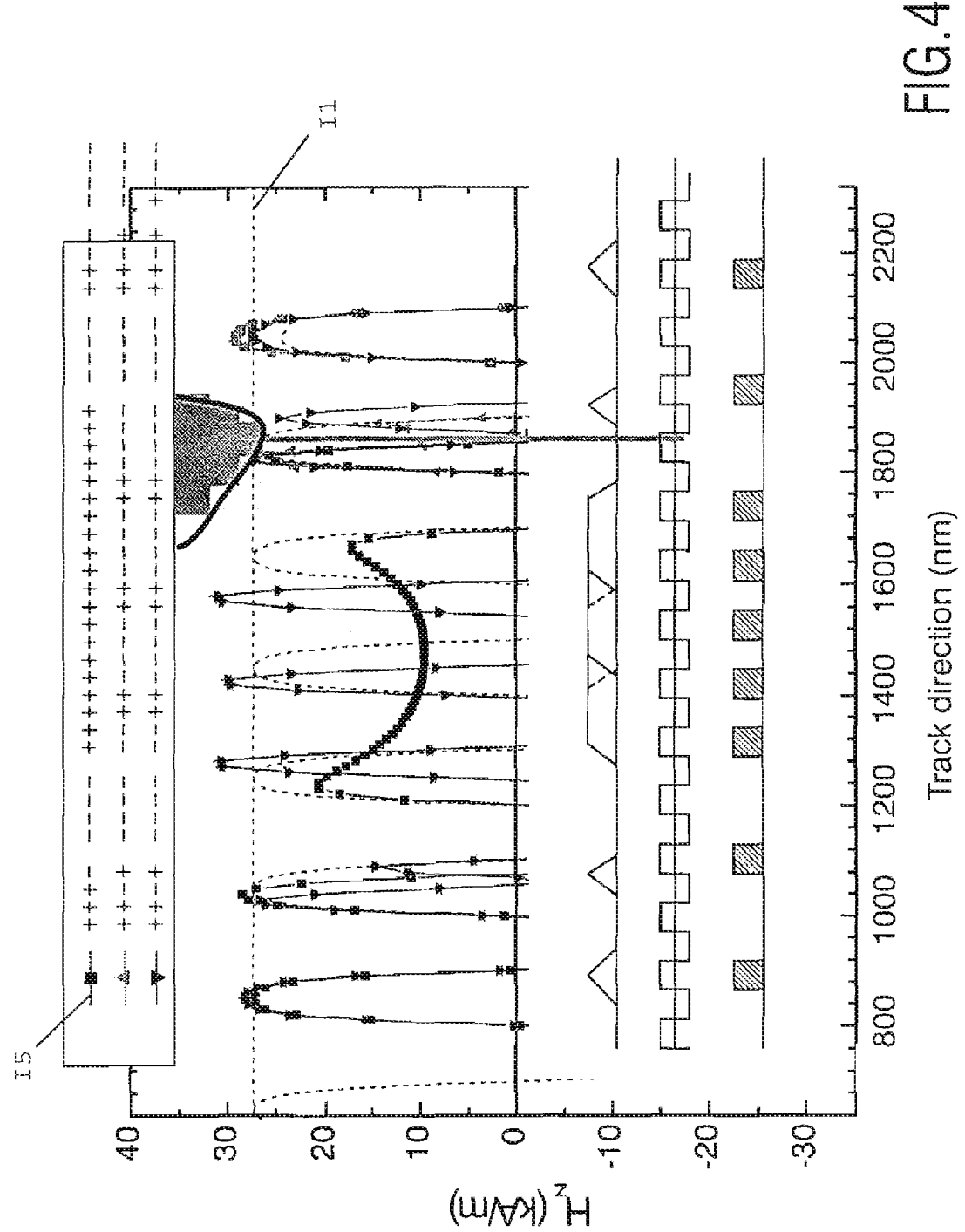
FIG. 4 shows a stray field characteristic and overlap for a specific write pattern according to a first example of the write scheme according to the preferred embodiment.

FIG. 4 shows a corresponding schematic diagram for an I5 in an I1 carrier, according to first example of the preferred embodiment for a channel bit length b=100 nm. As indicated in the upper portion, each channel bit is divided into four units, and the magnetization direction for each unit is indicated by '+' or '−'. The black squares represent a continuously written 15. The other curves show three separated peaks for the I5 run length, with a stray field larger than the I1 carrier level indicated by the dashed line. The resulting overlap (vs. time) obtained as the coercivity profile (solid line, asymmetric 'parabolic') scans over the bit or domain pattern is shown below the stray field curves for the down triangles. The overlap is continuous over the I5 run length. Thus, when applying a modulated external field $H_{ext}$, as indicated by the next lower waveform in FIG. 4, the resulting signal indicated by the lowest waveform in FIG. 4 is correct. Comparing the other curves, it is clear that the marks neighboring the I5 run length also need to be modified to keep their stray field at the I1 carrier level (dashed line).

Figure 5:
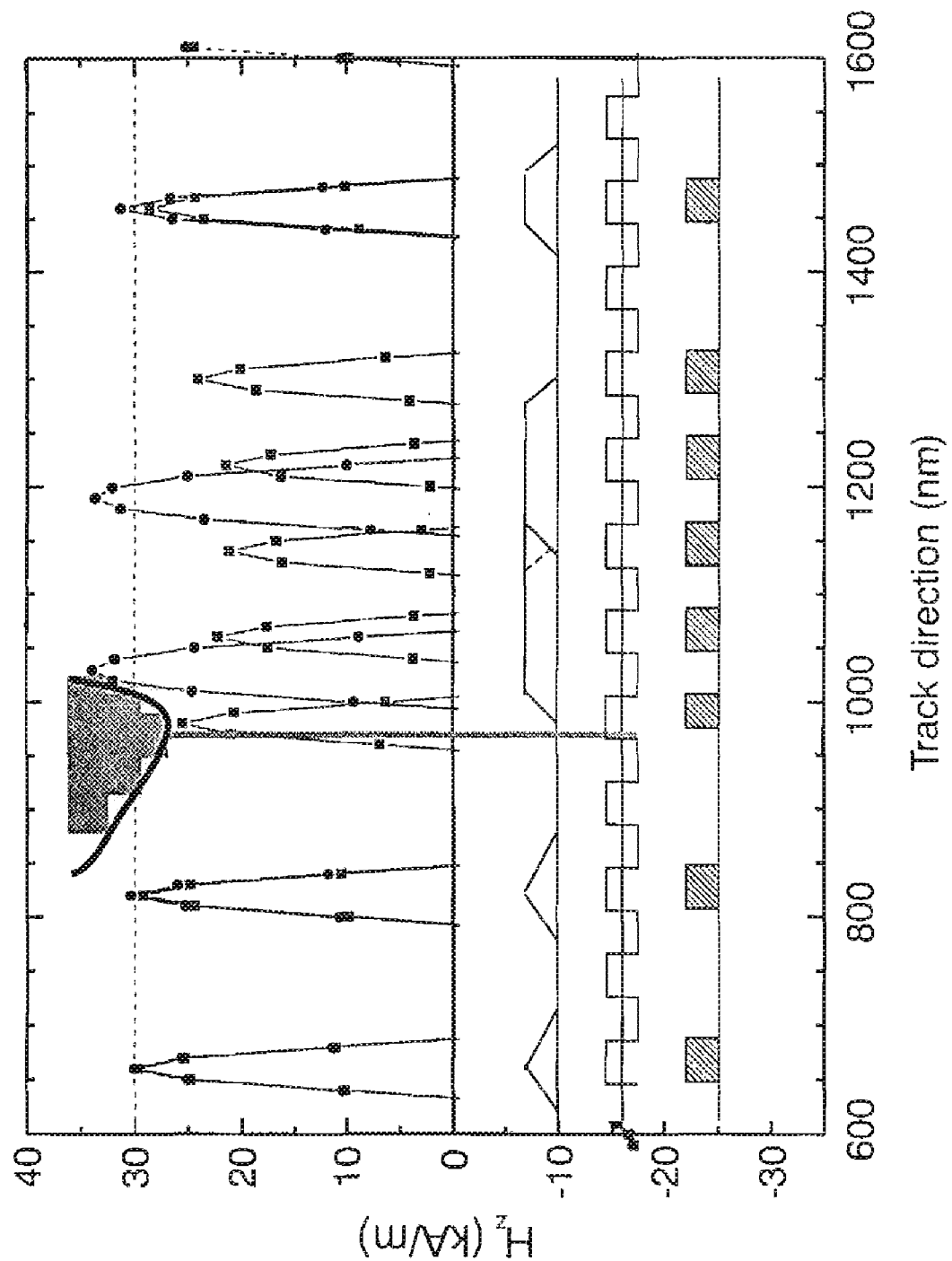
FIG. 5 shows a stray field characteristic and overlap for a specific write pattern according to a second example of the write scheme according to the preferred embodiment.

FIG. 5 shows a similar schematic diagram for a channel bit length of 80 nm and a simple write strategy of L2/L1=1, where L1=L2=40 nm (see, for example, FIG. 8A). The dashed curves represent the I1 carrier, the squares show the I5 run length for the conventional simple write strategy. The circles represent the proposed write strategy according to a second example of the preferred embodiment, in which only two marks are used to give correct MAMMOS readout for the I5 run length, under readout conditions that allow correct readout of I1 carriers as well. Also in the second example, the overlap is continuous over the I5 run length. Thus, when applying a modulated external field $H_{ext}$, the resulting signal is again correct.

Figure 6A:
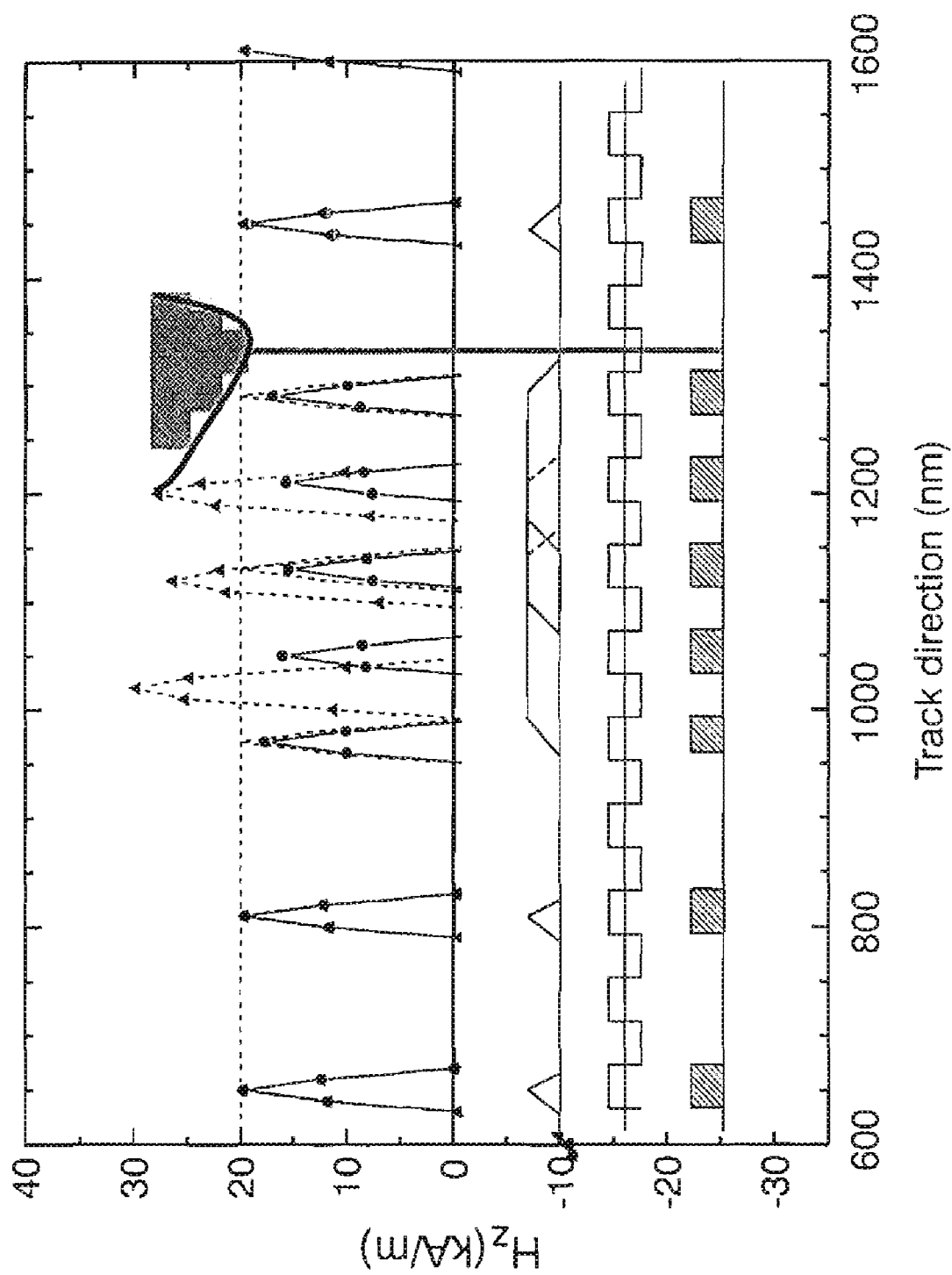
FIG. 6A shows a stray field characteristic and overlap for a specific domain pattern according to a third example of the write scheme according to the preferred embodiment.

FIG. 6A shows a similar graph, but for a ratio L2/L1=3, where L1=20 nm and L2=60 nm (see, for example, FIG. 8B). Although the total stray field is reduced, the flexibility to choose the best bit pattern for the I5 run length is much greater than for L2/L1=1. The circles represent the conventional simple write strategy, also with L2/L1=3. The overlap for the triangles is again shown in the next lower waveform, resulting in correct readout.

Figure 2A:
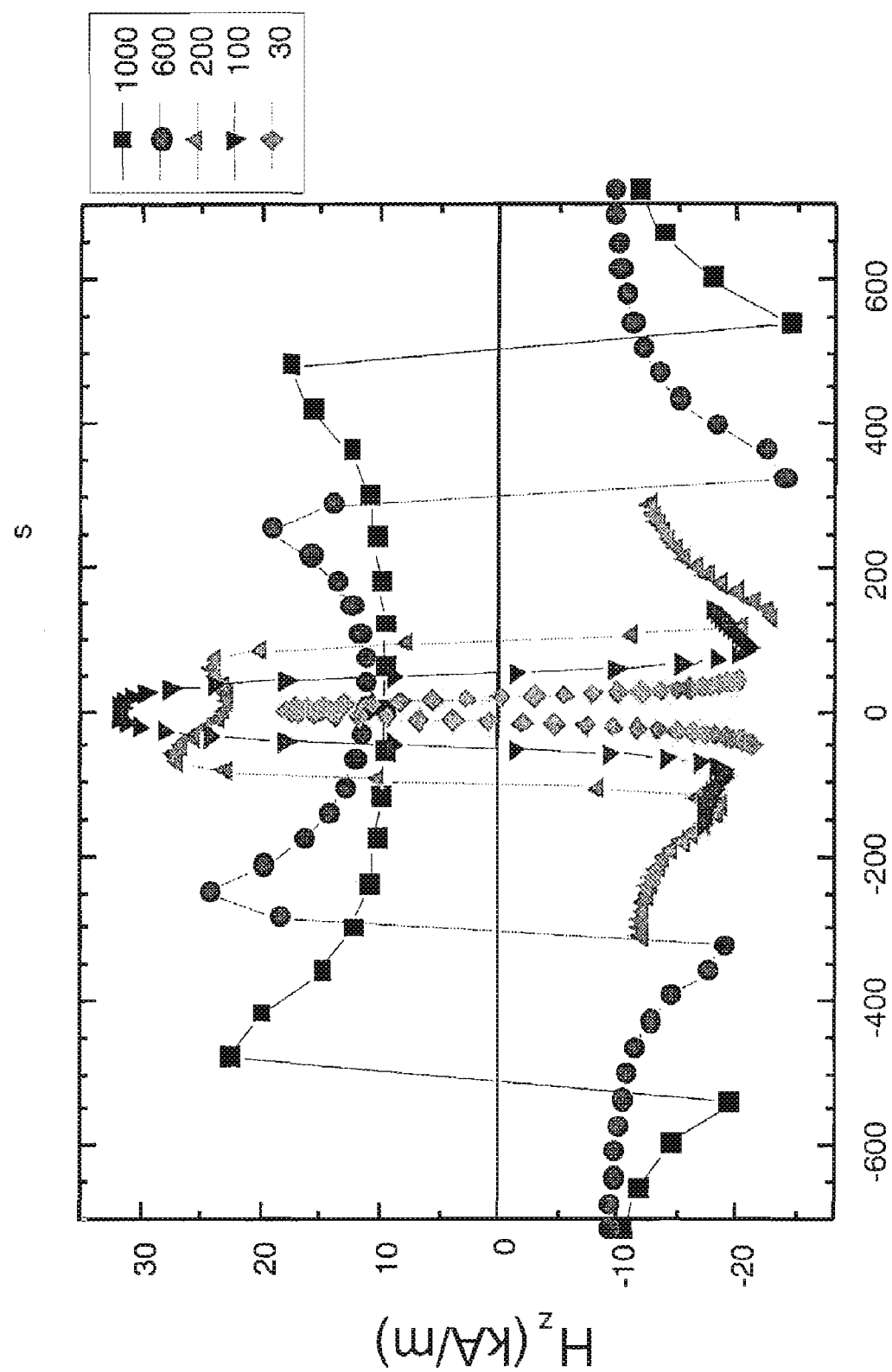
FIG. 2A shows a diagram of a stray-field component perpendicular to the disk versus a track direction for different bit or run lengths.
Figure 2B:
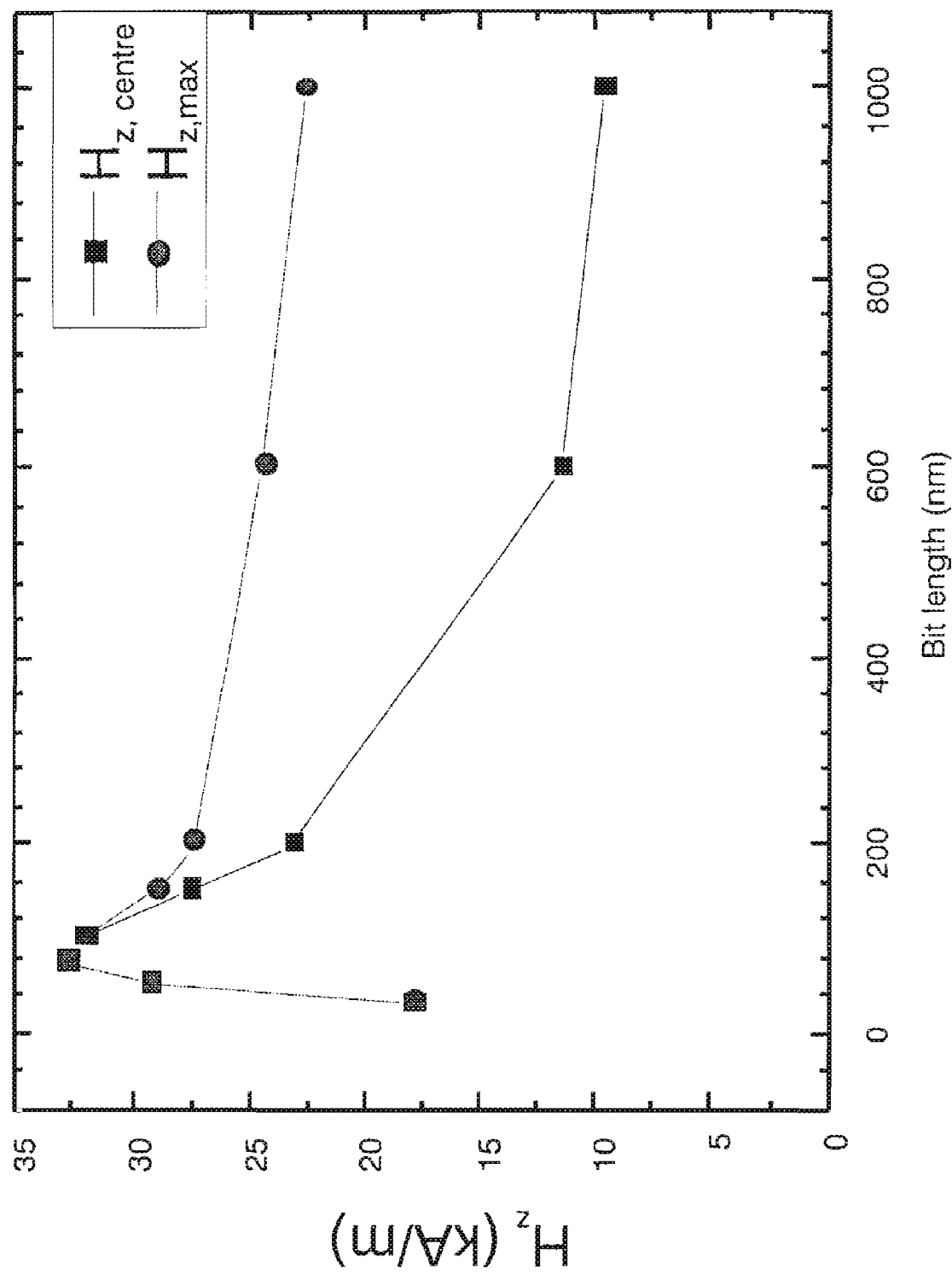
FIG. 2B shows a diagram of a stray-field component versus bit or run-length of a mark region.
Figure 3:
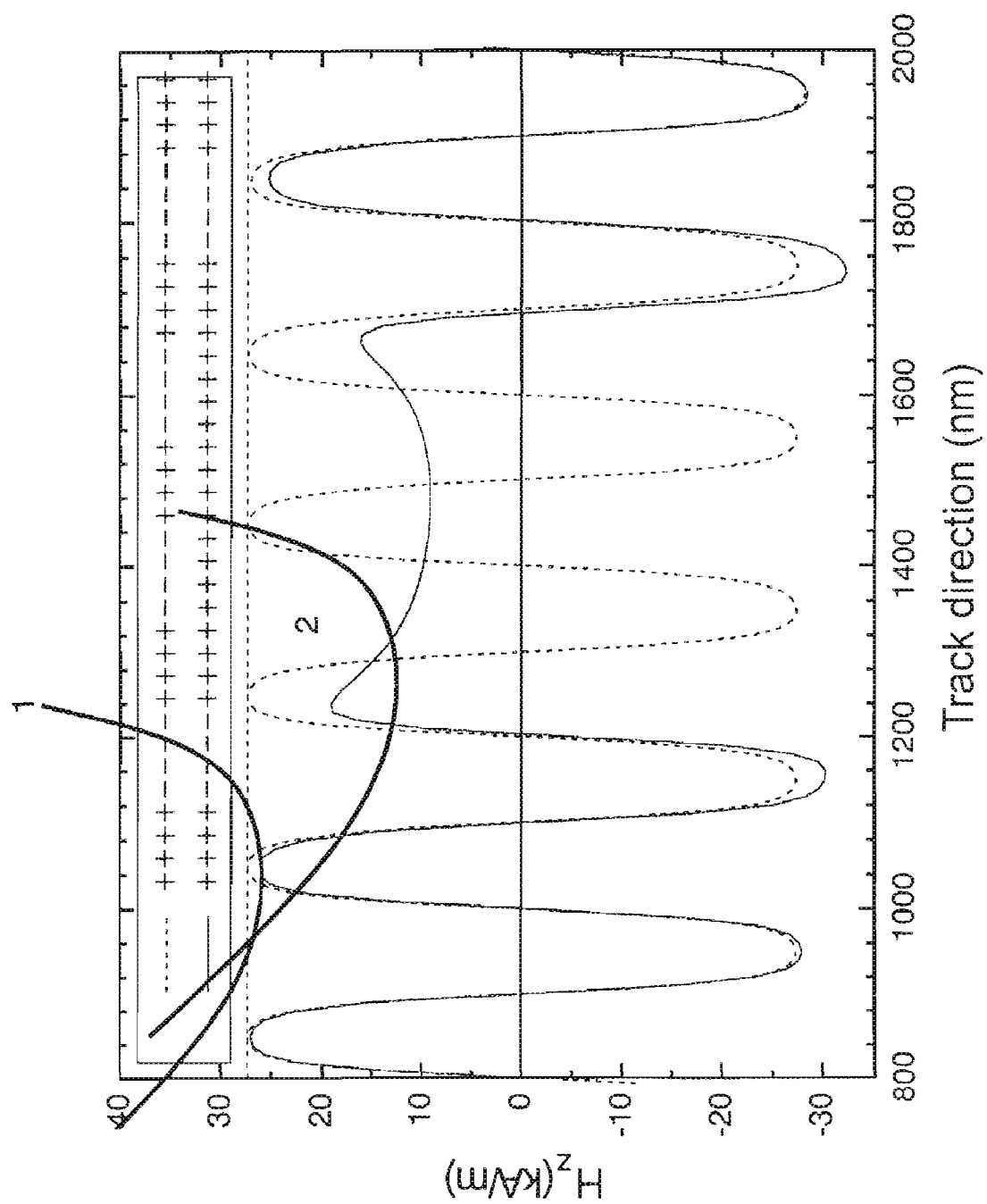
FIG. 3 shows a diagram indicating stray field characteristics of I1 carriers and an I5 carrier, and different coercive field profiles.
Figure 6B:
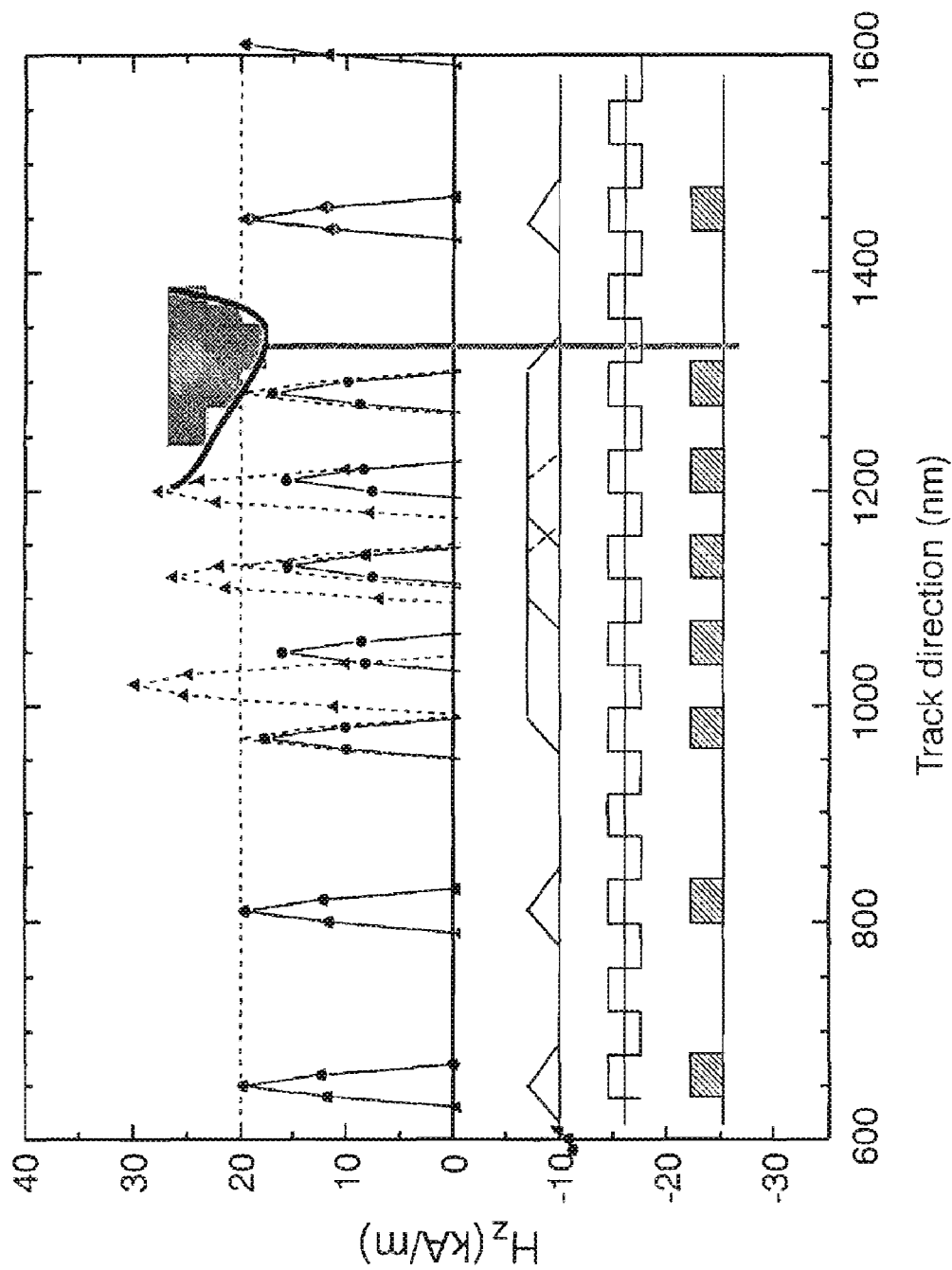
FIG. 6B shows a stray field characteristic and overlap for a specific domain pattern according to the third example of the write scheme according to the preferred embodiment, at a lower coercive profile.

FIG. 6B is identical to FIG. 6A, but the overlap is drawn for a lower coercivity profile, e.g., higher laser power. Correct readout is still possible, demonstrating an improved power margin. This increased flexibility for larger L2/L1 ratios is mainly due to the fact that for (sub-)mark lengths below 80-100 nm, the stray field strongly increases with increasing bit length (see FIG. 2A). Moreover, the stray field increases if the surrounding non-mark length (separation between marks) increases, i.e., for higher L2/L1 ratios. Thus, starting from a sub-mark length of 20 nm (for b=80 nm and L2/L1=3 like in FIGS. 6A and 6B), there are many combinations of larger mark lengths and different separations to reach the desired stray fields.

One of the boundary conditions in the optimization process is the minimum length of a domain that can be used, which is determined by the limited modulation frequency of the field coil and its driver for writing, and the requirements for sufficient S/N and good thermal stability for readout. Thus, the increased flexibility of the proposed approach is very advantageous.

The proposed write strategy allows writing a long run length with sub-mark and/or sub-space lengths selected independent of the channel bit length. Thereby, the sum of the lengths L1 and L2 may arbitrarily be changed, such that a long run length can be written with few well-chosen domains with a stray field larger than the minimum field for MAMMOS readout. In this way, differences in readout conditions for all combinations of short and long run lengths can be eliminated, resulting in substantially improved power margins for random data.

It is noted, that the present invention is not restricted to the above preferred embodiment and can be applied to any magneto-optical recording process to reduce stray field variations and increase the read-out resolution.

The invention claimed is:

1. A method of recoverably recording information as a pattern of marks and spaces on a recording track of a magneto-optical recording medium, said method comprising the acts of:
    a) writing a mark region by having at least one sub-mark portion of a predetermined first length magnetized in a first direction substantially perpendicular to a recording surface of said recording medium and by having at least one adjacent sub-space portion of a predetermined second length magnetized in a second direction opposite to said first direction; and
    b) selecting the sum of said predetermined first and second lengths in dependence on said pattern of marks and spaces.

2. The method according to claim 1,
    wherein said selecting act is performed for said mark region based on patterns of previous and/or following marks and spaces.

3. The method according to claim 2,
wherein the length of said patterns of previous and/or following marks and spaces is a few hundred nanometers.

4. The method according to claim 1,
wherein said sum of said predetermined first and second lengths is set to be greater than a channel bit length.

5. The method according to claim 4,
wherein the number of said sub-mark portions in said mark region is smaller than the number of channel bits which correspond to the run length of said mark region.

6. The method according to claim 5,
wherein a mark region with a run length corresponding to five channel bits is written with two or three sub-mark portions separated by corresponding sub-space portions.

7. The method according to claim 1,
wherein said magneto-optical recording medium is a domain expansion recording medium comprising a storage layer and a readout layer.

8. The method according to claim 7, further comprising the act of setting the distance between said storage and readout layers based on a difference between the largest and the lowest values of a stray field along said mark region.

9. A recording apparatus for recoverably recording an information as a pattern of marks and spaces on a recording track of a magneto-optical recording medium, said apparatus comprising:
   a) writing means for writing a mark by having at least one sub-mark portion of a first predetermined length of said magneto-optical recording medium magnetized in a first direction substantially perpendicular to the recording surface of said recording medium and by having at least one adjacent sub-space portion of a second predetermined length magnetized in a second direction opposite to said first direction; and
   b) control means for selecting the sum of said predetermined first and second lengths in dependence on said pattern of marks and spaces.

10. The recording apparatus according to claim 9,
wherein said control means is arranged to select said sum of said predetermined first and second lengths in dependence on the patterns of previous and/or following marks and spaces.

11. The recording apparatus according to claim 9,
wherein said control means is arranged to set the number of said sub-mark portions in said mark region to a value smaller than the number of channel bits which correspond to the run length of said mark region.

12. The recording apparatus according to claim 9,
wherein said recording apparatus is a disk player for a magneto-optical disk to be read by a domain expansion technique.

13. A magneto-optical recording medium on which an information is recoverably recorded on a recording track as a pattern of marks and spaces, wherein a mark region comprises at least one sub-mark portion of a first predetermined length magnetized in a first direction substantially perpendicular to the recording surface of said recording medium and at least one adjacent sub-space portion of a second predetermined length magnetized in a second direction opposite to said first direction, and wherein the sum of said predetermined first and second lengths is selected along said recording track in dependence on said pattern of marks and spaces.

14. The recording medium according to claim 13,
wherein said magneto-optical recording medium is a magneto-optical disk to be read by a domain expansion technique.

15. The method according to claim 1,
wherein a ratio of the second lengths to the first lengths is selected to be equal or greater than 1.

16. The method according to claim 1,
wherein a ratio of the second lengths to the first lengths is selected to be in a range of 1 to 3.

17. The recording apparatus according to claim 9,
the control means for selecting a ratio of the second lengths to the first lengths to be equal or greater than 1.

18. The recording apparatus according to claim 9,
the control means for selecting a ratio of the second lengths to the first lengths to be in a range of 1 to 3.

19. The recording medium according to claim 13,
wherein a ratio of the second lengths to the first lengths is selected to be equal or greater than 1.

20. The recording medium according to claim 13,
wherein a ratio of the second lengths to the first lengths is selected to be in a range of 1 to 3.

* * * * *